United States Patent

[11] 3,592,504

| [72] | Inventor | Bela Sandor |
| | | Detroit, Mich. |
| [21] | Appl. No. | 845,422 |
| [22] | Filed | July 28, 1969 |
| [45] | Patented | July 13, 1971 |
| [73] | Assignee | General Motors Corporation |
| | | Detroit, Mich. |

[54] DUAL-ACTION TAILGATE
3 Claims, 23 Drawing Figs.

[52] U.S. Cl. ............................................ 296/50,
16/147, 292/216, 292/336.3, 296/57 R
[51] Int. Cl. .................................................. B60j 5/10
[50] Field of Search ................................. 296/50, 57,
106; 292/48, 216, 280, 336.3; 49/192, 193; 16/147

[56] References Cited
UNITED STATES PATENTS

| 3,387,406 | 6/1968 | Coker et al. | 49/192 |
| 3,400,961 | 9/1968 | Koch et al. | 296/50 (X) |
| 3,408,100 | 10/1968 | McKey | 292/216 |
| 3,454,299 | 7/1969 | Hewitt et al. | 296/50 |

Primary Examiner—Benjamin Hersh
Assistant Examiner—Leslie J. Paperner
Attorneys—W. E. Finken and D. L. Ellis ABSTRACT: A dual-action tailgate for a conventional station wagon type vehicle is mounted on the vehicle body for swinging movement into and out of the rear opening thereof about a vertical axis as a door, or about a horizontal axis as a dropgate, by a biaxial multihinge and by a pair of hinge-latches each of which hinge-latches provides a pivotal connection about one of the two axes and is releasable to allow swinging movement of the tailgate about the other of the two axes. The operating arrangement for the tailgate includes a main latch for maintaining the tailgate in a closed position and having a pair of operating levers connected by rigid links to the hinge-latch assemblies for release of the main latch simultaneously with release of either hinge-latch. Blocking means on the operating levers function independently of the condition of the main latch to prevent simultaneous or concurrent release of both hinge-latches by sensing, through the rigid links the condition of the hinge-latches.

INVENTOR
Bela Sandor
BY
D.L. Ellis
ATTORNEY

DUAL-ACTION TAILGATE

In station wagon type vehicles having tailgates of the dual-action variety wherein the tailgate is supported for pivotal movement about a vertical axis by a biaxial multihinge and a first releasable hinge-latch and for pivotal movement about a horizontal axis by the biaxial multihinge and a second releasable hinge-latch, the gate operating arrangement must include blocking means for preventing simultaneous or concurrent release of the two hinge-latches. In prior dual-action tailgates wherein a further or main latch performs the control of the blocking means so that once the main latch reaches latched position the blocking means become neutralized, it is possible to inadvertently circumvent the blocking means and release both hinge-latches. This occurs, for example, with tailgates which in certain circumstances of forced closing are so warped out of true plane that when closing the tailgate in one mode of operation the main latch becomes latched and neutralizes the blocking means before the released hinge-latch is secured.

The primary feature of this invention is that it provides an improved dual-action station wagon tailgate. Another feature of this invention is that it provides a dual-action tailgate including an operating arrangement having a blocking system the accidental circumvention of which is rendered substantially impossible. Yet another feature of this invention resides in the provision in the operating arrangement of a dual-action station wagon tailgate of blocking means controlled directly by the hinge-latches completely independently of the main latch. Still another feature of this invention is that it provides a dual-action station wagon tailgate having blocking means incorporated within the operating lever system of the main latch and controlled by the hinge-latches through a plurality of rigid links connecting the latter with the main latch. These and other features of this invention will be readily apparent from the following specification and from the drawings wherein:

Figure 1:
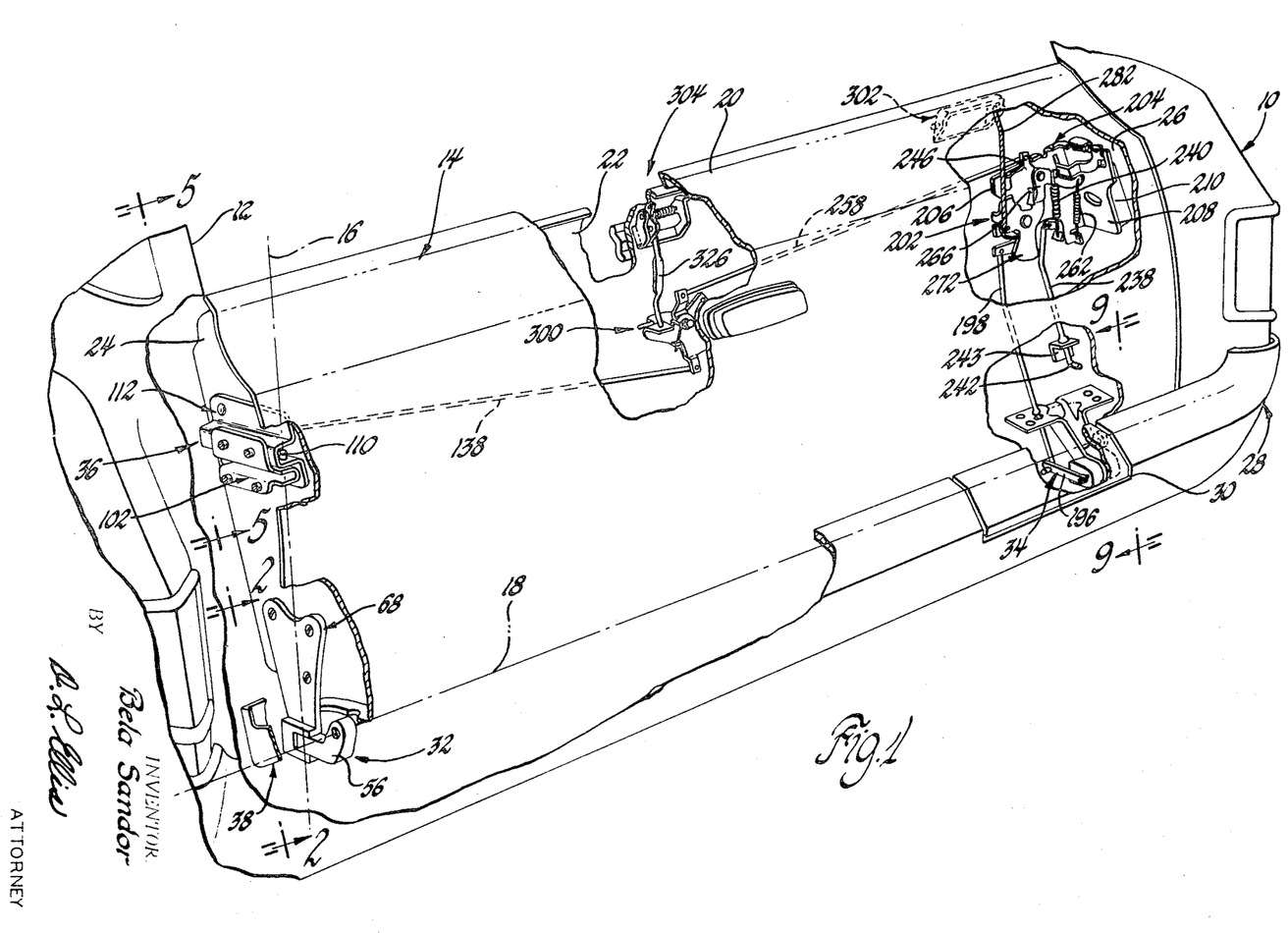
FIG. 1 is a partially broken away perspective view of the rear portion of a station wagon type vehicle having a dual-action tailgate according to this invention.

Referring now to FIG. 1 of the drawings, a station wagon type vehicle 10 has a rear compartment, not shown, with a conventional rear facing opening 12 thereto. By means to be fully described hereinafter, a closure or tailgate 14 is mounted on the body for swinging movement into and out of the opening 12 as a door about a vertical axis 16 or as a conventional drop-gate about horizontal axis 18. Tailgate 14 has an outer panel 20 and an inner panel 22 joined together in spaced relationship by side panels 24 and 26 and mounts therein a window panel, not shown, for closing the remainder of opening 12 in the closed position of the tailgate. The window panel is movable from such closing or raised position to a lowered position, wherein it is housed in a recess between panels 20 and 22, by a conventional manual or power-operated window regulator, not shown. A bumper structure 28, mounted on the vehicle body below opening 12, extends rearwardly of the body from the opening, and has therein a recess 30 the function of which will subsequently become apparent.

In description now of the tailgate mounting means and with further reference to FIG. 1, the tailgate is mounted for dual-action movement by a biaxial multihinge 32 at the lower left corner of the tailgate, a first hinge-latch assembly 34 located generally at the lower right corner of the tailgate and a second hinge-latch assembly 36 located generally at the upper left corner of the tailgate. As will appear hereinafter, biaxial multihinge 32, fixed between the body and the tailgate, provides a pivotal connection therebetween for swinging movement of the tailgate about both axes while each of the hinge-latches 34 and 36 provides a pivotal connection between the body and the tailgate for swinging movement of the latter about one of the two axes and is releasable to permit swinging movement of the tailgate about the other of the two axes.

Figures 2, 3, 4:
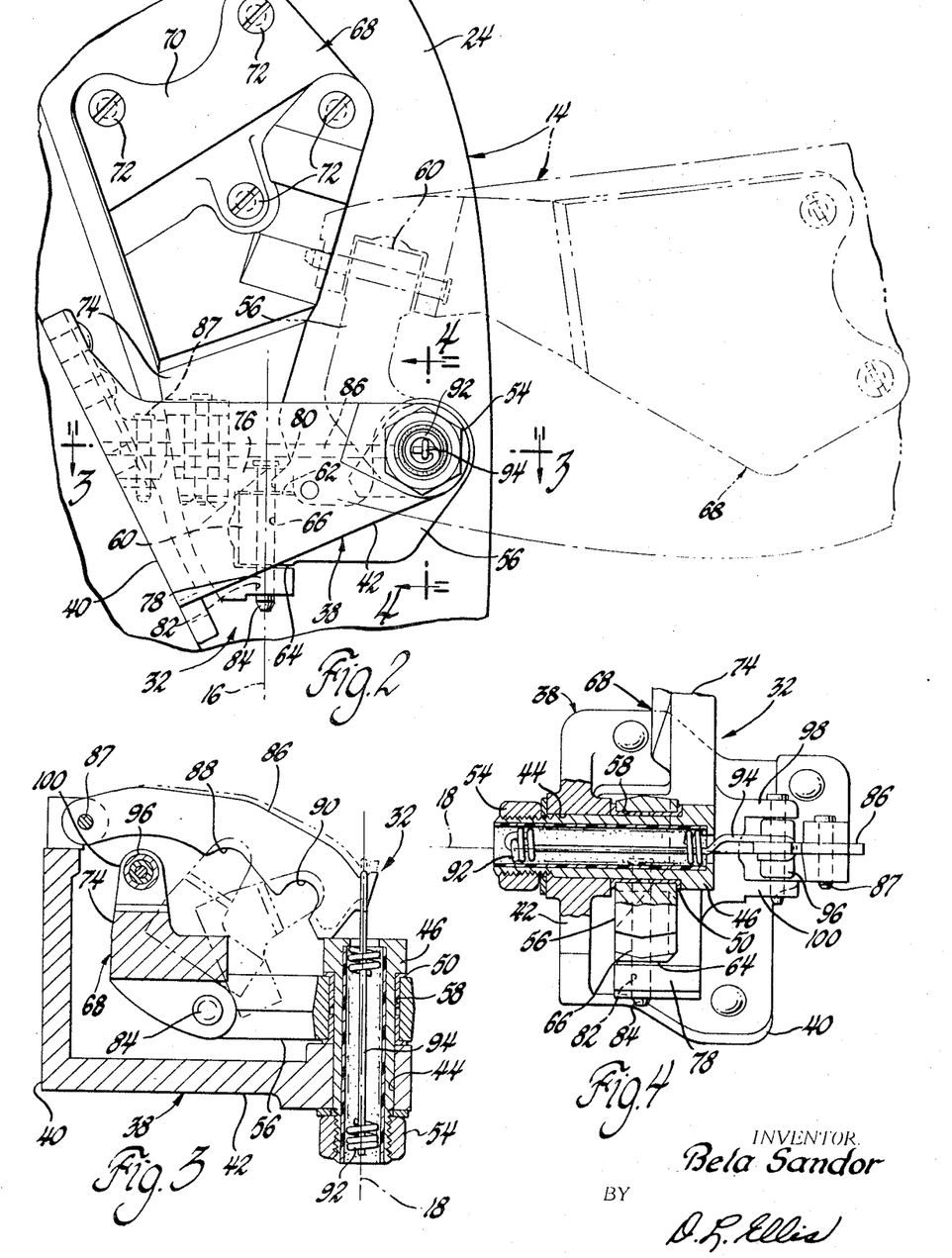
FIG. 2 is an enlarged view taken generally along the plane indicated by lines 2-2 in FIG. 1 showing the tailgate closed and opened as a drop-gate in solid and broken lines respectively.
FIG. 3 is a sectional view taken generally along the plane indicated by lines 3-3 in FIG. 2.
FIG. 4 is a sectional view taken generally along the plane indicated by lines 4-4 in FIG. 2.

Referring more particularly to FIGS. 2, 3, and 4, the biaxial multihinge 32 includes a stationary hinge plate 38 having thereon a flange portion 40 which is fixed to a rear facing wall portion, now shown, of the vehicle body adjacent the opening 12. An integral arm 42 extends rearwardly from the flange and has located generally at its outer extremity a bore 44 the axis of which bore lies on the horizontal pivot axis 18. A hollow pivot pin 46 is nonrotatably mounted within bore 44 by means of a spacer bushing 50 and a conventional threaded fastener 54, the axis of the pin lying on horizontal axis 18. An intermediate arm 56 is mounted at its bore 58 on the pivot pin over the bushing and at its other end includes a cylindrical boss 60 having bearing surfaces 62 and 64 and a central bore 66, the axis of which bore, in the tailgate closed position, lies on vertical axis 16, FIGS. 1 and 2. A further hinge plate 68 has a flange portion 70 fixed to side panel 24 of the tailgate by conventional means, such as screws 72, and has depending therefrom an offset integral arm 74, the lower extremity of which terminates in a pair of bearing flanges 76 and 78 having a pair of aligned bores 80 and 82 therethrough. Bearing flanges 76 and 78 generally engage bearing surfaces 62 and 64 on cylindrical boss 60 and aligned bores 80 and 82 register with bore 66 in the boss. A pivot pin 84 pivotally connects the intermediate arm 56 and the hinge plate 68 for swinging movement of the tailgate about vertical pivot axis 16. In the biaxial multihinge, then, the tailgate is supported for rotation as a drop-gate about horizontal axis 18 by hollow pivot pin 46 about which the intermediate arm 56, hinge plate 68 and the tailgate rotate clockwise, with no relative movement therebetween, from the solid line position in FIG. 2 to the broken line position therein and is supported for rotation as a door about the vertical axis 16 through pin 84 in intermediate arm 56 about which the hinge plate 68 and the tailgate rotate clockwise from the solid line position indicated in FIG. 3.

Biaxial multihinge 32 further includes a hold-open arrangement for maintaining the tailgate in the open position when operated in the door mode. Referring to FIGS. 3 and 4, the hold-open arrangement includes a detent arm 86 mounted at 87 on flange 40 of hinge plate 38 for pivotal movement generally in a horizontal plane and having thereon notches 88 and 90 corresponding to partially and fully opened door positions of the tailgate. A compression spring 92 mounts within hollow pivot pin 46 and is attached to detent arm 86 by a rod 94 which passes through the center of the pin and is hooked between the detent arm and remote end of the spring to bias the detent arm in a clockwise direction, FIG. 3. A detent roller 96 is rotatably mounted between a pair of ears 98 and 100 extending laterally from offset integral arm 74 to lie in the horizontal plane of detent arm 86. In the door mode of operation, the tailgate, hinge plate 68 and integral arm 74 rotate clockwise about pin 84 in intermediate arm 56 and bring roller 96 into rolling contact with the edge of the detent arm 86 which contact causes counterclockwise rotation of the detent arm against the action of spring 92. When the roller passes into notch 88 the tailgate is releasably held from returning to the closed position under its own weight. Further opening of the tailgate as a door rolls the roller 96 into notch 90 whereupon the spring 92 maintains the roller in the notch to releasably hold the tailgate in the fully open position until sufficient closing forces are applied to the tailgate to overcome spring 92 and cam the detent arm counterclockwise to allow the roller to roll back along the edge of the detent arm to its original solid line position in FIG. 3. In the conventional dropgate mode of operation, the tailgate, hinge plate 68 and intermediate arm 56 rotate about pivot pin 46 and horizontal axis 18 so that roller 96 moves in a plane generally perpendicular to the plane of the detent lever and thereby avoids any engagement therewith, FIG. 2.

Figure 7:
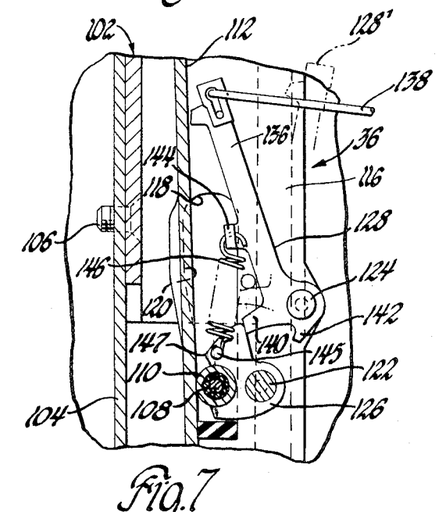
FIG. 7 is a sectional view taken generally along the plane indicated by lines 7-7 in FIG. 6.
Figure 8:
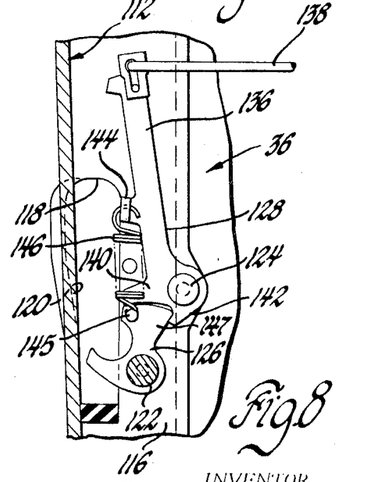
FIG. 8 is similar to FIG. 7 but showing the hinge-latch in released condition.

In description now of hinge-latch 36 and with particular reference to FIGS. 5, 6, 7 and 8, a striker mounting plate 102 is fixed to the sidewall 104 of opening 12 by conventional means, such as screws 106. Pressed into apertures in the mounting plate is a stud 108 the axis of which lies on vertical axis 16 and upon which is rotatably mounted by antifriction bearings, FIG. 7, a cylindrical striker cap 110. A latch housing 112 mounts on tailgate sidewall 24, as by rivets 114, and includes a lower horizontal mounting portion 116 having an elongated aperture 118 provided with a dovetail or camming edge 120, as best seen in FIG. 7. A pair of studs 122 and 124 fixed to mounting portion 116 rotatably mount a forked latchbolt 126 and a detent lever 128 respectively. Detent lever 128 has an elongated operating arm 136, with one end of a rigid draft link 138 pivotally connected thereto, a further pair of arms 140 and 142 and an apertured upstanding flange 144. A coil tension spring 146 attaches at one end thereof to the bolt 126 at 145 and at the other end to flange 144 to bias the latchbolt 126 clockwise and the detent lever 128 counterclockwise, FIG. 7.

Hinge-latch 36, in the latched condition thereof, function as a hinge for the door mode of tailgate operation and releases to allow the conventional drop-gate mode of operation. In the latched condition, FIGS. 5, 6 and 7, fork bolt 126 embraces striker cap 110 and is maintained so engaged by arm 140 abutting a shoulder 147 of the bolt under the urging of coil spring 146. The antifriction bearings between the stud 108 and striker cap 110 permit rotation of the cap, with the latchbolt 126, the latch housing 112 and the tailgate as a unit about the stud 108 and, since the axis of the stud 108 is aligned on vertical axis 16, the combination of biaxial multihinge 32 and hinge-latch assembly 36 provides a pair of pivotal connections between the tailgate and the vehicle body for swinging movement of the tailgate about vertical axis 16.

To release hinge-latch for drop-gate operation, detent lever 128 is pivoted clockwise against the action of spring 146 to a full releasing position 128', FIG. 7, by means to be fully described hereinafter, so that arm 140 clears the edge of shoulder 147, whereupon the bolt is permitted to rotate clockwise into arm 142 by the dropping movement of the tailgate and the urging of spring 146 thereby to release from the striker cap 110 and the stud 108. Following rotation to full releasing position 128' and subsequent to dropping of the tailgate in the drop-gate mode, the detent lever 128 is rotated counterclockwise by spring 146 back toward its detenting position but is blocked from attaining that position by arm 140 which rests upon the edge of the latchbolt adjacent shoulder 147 and thereby the detent is held in an intermediate rotated position, FIG. 8, between the limit positions of detenting and full releasing positions. Dropping of the tailgate about horizontal axis 18 lifts latch housing 112 off of and away from mounting plate 102 while the stud 108 and striker cap 110 exit the latch housing through aperture 118.

Figure 5:
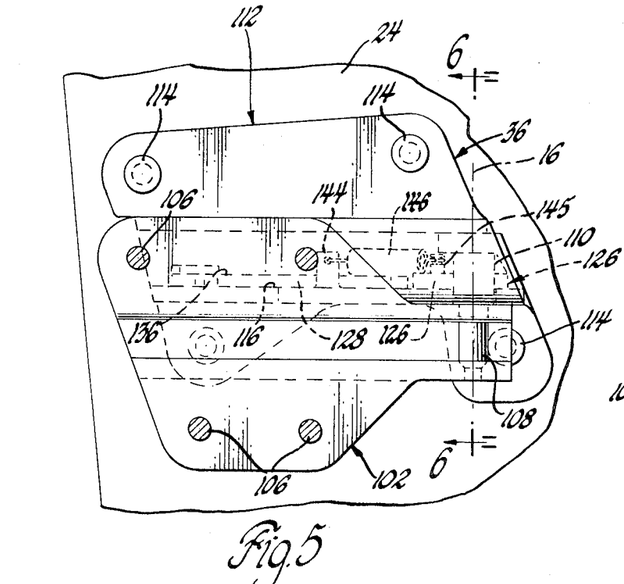
FIG. 5 is an enlarged view taken generally along the plane indicated by lines 5-5 in FIG. 1.
Figure 6:
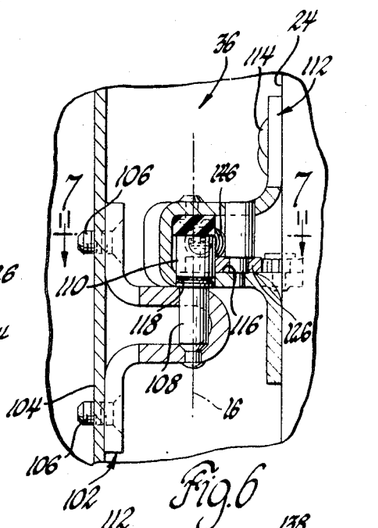
FIG. 6 is a sectional view taken generally along the plane indicated by lines 6-6 in FIG. 5.

In lifting the tailgate and relatching of hinge-latch 36, final stages of closing movement of the tailgate brings the latch housing 112 over the striker plate 102 with the stud 108 and striker cap 110 entering the housing through the wide end of aperture 118. From this point the relative movement between the mounting plate 102 and the housing 112 is generally longitudinal with the housing moving forward, leftward as shown in FIG. 5, over the stud and striker cap until rolling contact is made between the cap and cam edge 120 of the aperture 118, whereupon edge 120 rolls over the stud and striker cap until the striker cap reaches the narrow end of the housing. The cam edge 120 provides a dovetail which pulls the upper edge of the tailgate toward the body sidewall 104, thereby relieving from hinge-latch 34 a significant portion of that part of the weight of the tailgate which would be supported thereby. Further, the significant horizontal or preload force thus placed on the stud and striker cap serves to prevent door sag when the tailgate is pivoted about vertical axis 16. With the striker cap at the narrow end of the housing 112, final longitudinal movement of the housing over the striker cap brings the latter into contact with the latchbolt 126 whereupon the latchbolt is rotated counterclockwise from the position of FIG. 8 until the end of shoulder 147 clears arm 140 on the detent lever 128 and the spring 146 rotates the latter counterclockwise to the detenting position of FIG. 7.

Referring now to FIGS. 1, 9, 10, 11 and 12 in description of hinge-latch 34, a main mounting plate 148 has an integral flange 150 thereof attached to the lower wall of the tailgate, now shown, in a conventional manner. On one side of the mounting plate is fixedly secured a boxlike guide and support plate 152 having in one wall thereof a mouth portion 154, and on the other side of the mounting plate is fixedly secured a latch cover and support housing 156. A bolt shaft 158 has one end thereof journaled in support plate 152 at 160 and is journaled intermediate its ends in mounting plate 148 at 162. A fork-type latchbolt 164 having a pair of arms 166 and 168 is fixedly secured to the bolt shaft between the support plate and main mounting plate for rotation with the shaft as a unit. A cam plate 170 is secured to the end of shaft 158 within the housing 156 for rotation as a unit with the latchbolt, the cam including a detent shoulder 172 and a lever holding edge 174 and having an anchor pin 176 fixed thereto. A detent lever shaft 178 has one end thereof journaled in the main support plate at 180 and is journaled intermediate its ends in housing 156 at 182. Fixedly secured to the detent lever shaft, within the housing 156 for rotation as a unit therewith is a detent lever 186 including a detent arm 188 and a lever arm 190 having flange 192 thereon. A coil tension spring 194 is hooked between the anchor pin 176 on the cam plate and flange 192 on the lever arm to bias the cam plate and fork bolt counterclockwise toward released position shown in FIG. 10 and the detent lever and detent lever shaft clockwise toward the bolt detenting position shown in FIG. 9. A detent operating lever 196 having a rigid link 198 pivotally connected thereto is fixedly secured to the end of the detent lever shaft for movement as a unit with the detent lever.

Figure 12:
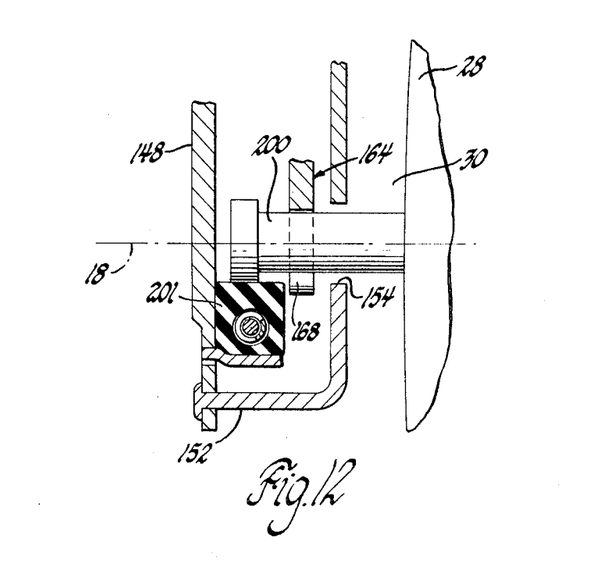
FIG. 12 is a sectional view taken generally along the plane indicated by lines 12-12 in FIG. 9.

In the closed position of the tailgate, FIG. 1, the hinge-latch 34, depending from the lower edge of the tailgate, is housed within recess 30 in the bumper structure 28 and latchbolt 164 engages a striker pin 200 mounted on one vertical side of bumper recess 30 and extending therefrom along horizontal pivot axis 18, FIG. 12. In the latched condition, FIG. 9, the hinge-latch 34 is restrained against fore and aft movement relative to the vehicle body by the fork arms 166 and 168 and against substantial vertical movement by the latchbolt 164 and mouth 154 of the support plate 152. As seen in FIG. 12, dovetail wedge block 201 slidably mounted on mounting plate 148 engages the head of the striker pin in conventional manner. However, the hinge-latch 34, particularly bolt 164 and dovetail block 201 thereof, are relatively freely rotatable about the striker pin while in latched condition. Thus, the combination of biaxial multihinge 32 and hinge-latch 34 provides a pair of hinge connections between the vehicle body and tailgate for pivotal dropping movement of the latter about horizontal axis 18.

Figure 9:
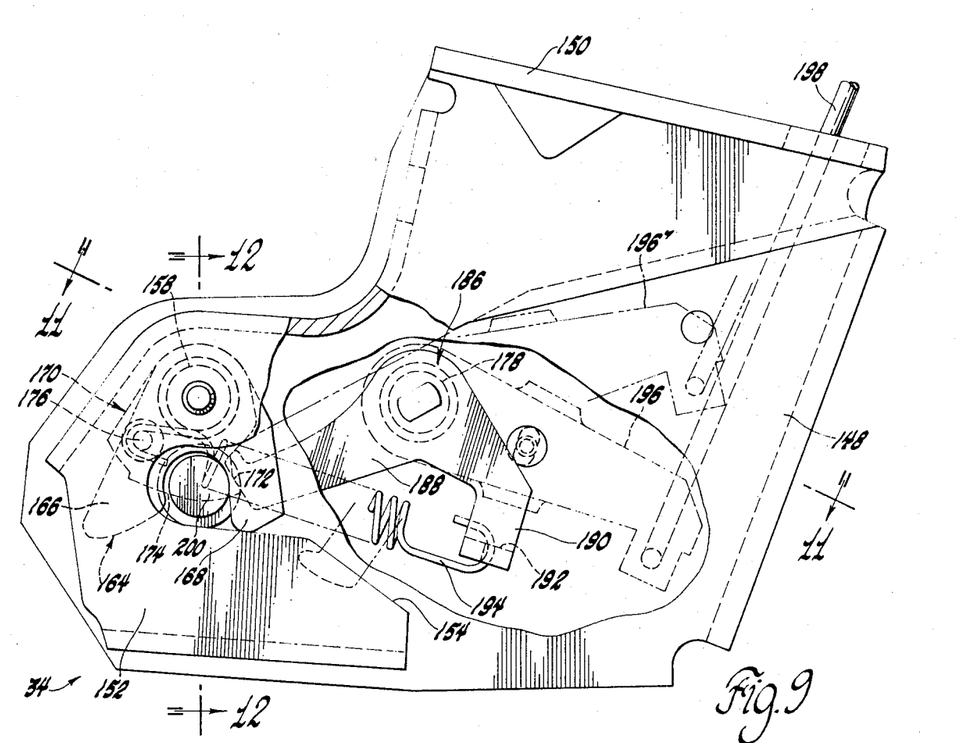
FIG. 9 is an enlarged partially broken away view taken generally along the plane indicated by lines 9-9 in FIG. 1.
Figure 10:
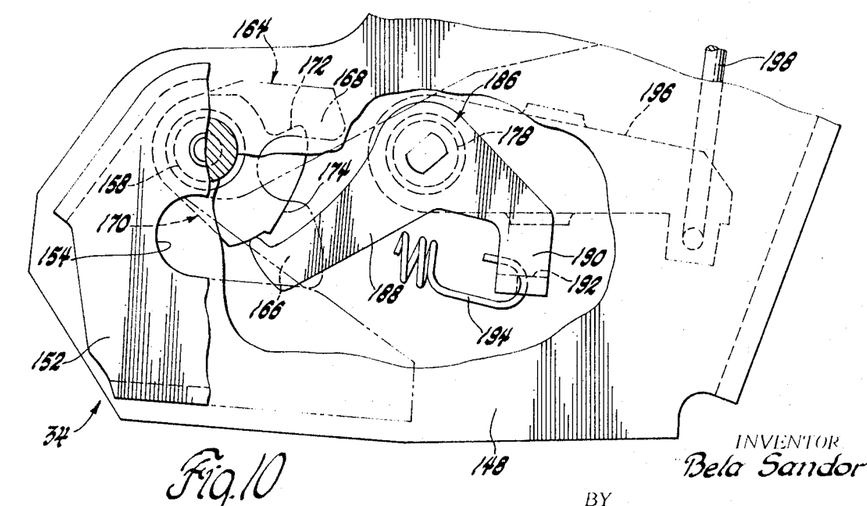
FIG. 10 is similar to FIG. 9 but showing the hinge-latch in released condition.
Figure 11:
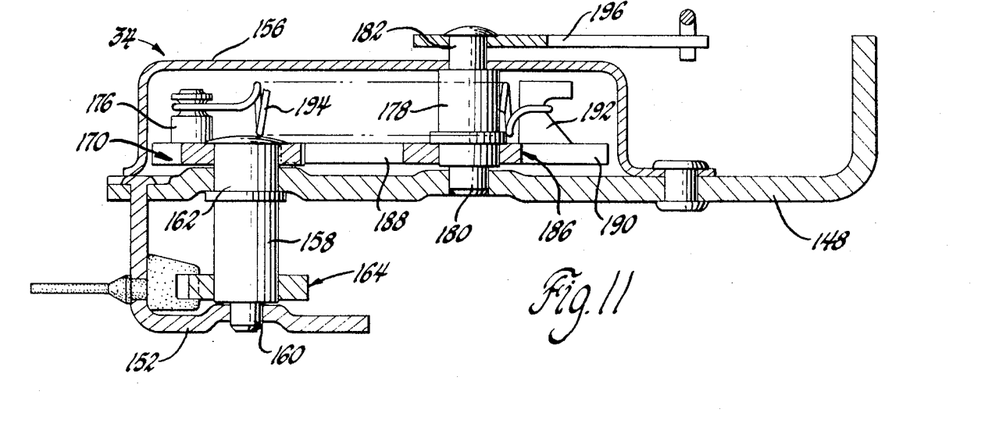
FIG. 11 is a sectional view taken generally along the plane indicated by lines 11-11 in FIG. 9.

To unlatch hinge-latch 34 for door operation, the detent lever 186, shaft 178 and lever 196 are rotated counterclockwise as a unit, by means to be fully described hereinafter, against the action of spring 194 to a full releasing position 196°, FIG. 9, wherein detent arm 188 clears the edge of detent shoulder 172 on the cam plate whereupon the cam plate, the shaft 158 and the latchbolt 164 are permitted to rotate counterclockwise under the bias of spring 194 to release the striker pin 200 as the tailgate is swung outwardly as a door from closed position. Following rotation to full releasing position, the detent lever, shaft 178 and the lever 196 unit is rotated clockwise back toward its detenting position of FIG. 9 but is blocked from attaining that position by detent arm 188 which rests upon the cam holding edge 174 and thereby maintains the detent lever 186, shaft 178 and lever 196 unit in an intermediate rotated position, FIG. 10, between the limit positions of detenting and full releasing position.

From the open position of the tailgate swung out as a door, final stages of closing movement brings hinge-latch 34 into bumper recess 30 whereupon mouth portion 154 of the support plate envelops the striker pin 200 to guide the latchbolt 164 into engagement therewith. The latchbolt 164 is rotated clockwise, FIG. 10, upon engagement with the striker pin until latching position is attained, whereupon spring 194 urges the detent lever clockwise until the detent arm 188 is fully seated in detenting position behind detent shoulder 172. Simultaneously, the detent lever shaft 178 and lever 196 are rotated clockwise by detent lever 186 also to their original positions, FIG. 9.

In description now of the tailgate operating arrangement and with reference to FIG. 1, a main latch 202 is mounted inside the tailgate for the purpose of releasably retaining the upper right corner of the tailgate within the opening 12 and which main latch includes means for preventing simultaneous or concurrent release of both hinge-latches. With reference now to FIGS. 13 thru 19 inclusive, the main latch 202 is mounted between inner and outer tailgate panels 22 and 20 and includes a L-shaped latch frame 204 having a leg 206 parallel to the inner panel 22 and a further leg 208 to which is attached a latch bolt housing 210. The frame 204 is fixed to the tailgate through securement of the latch housing 210 to the tailgate side panel 26. Latch housing 210 includes a mouth portion 211 which, when the housing is mounted in the tailgate, registers with a similarly shaped aperture in the side panel 26, not shown, for the purpose of admitting into the latch housing 210, in the tailgate closed position, a conventional striker pin 212 mounted on the sidewall of the opening 12, FIG. 13. Journaled within the latch housing is a shaft 213 having rotatable as a unit therewith a latchbolt 214 including a holding surface 215 and a pair of detent shoulders 216 and 218 corresponding to the fully latched and safety latched conditions of the bolt. A torsion spring 222 on shaft 213 biases the latch bolt counterclockwise from the fully latched position shown in FIG. 14 toward unlatched position. A shaft 223 is journaled at one end thereof in the housing 210 and intermediate its ends in frame leg 208, the shaft having secured thereon within the latch housing 210 a detent lever 224 engageable with shoulders 216 and 218 for holding the latch bolt in the safety and fully latched positions. A detent release lever 228 is secured to the shaft 223 inside of frame leg 208 for rotation as a unit with the shaft and detent lever and has a portion thereof extending through an aperture 229 in leg 206, FIGS. 13 and 14, so that upward movement of the lever in the aperture rotates the shaft 223 and detent lever 224 counterclockwise to disengage the latter from the latchbolt detenting shoulders. A tension spring 230 mounted between frame leg 208 and the release lever biases the latter, the shaft 223 and the detent lever clockwise toward engagement with the latchbolt shoulders.

Figures 17, 18:
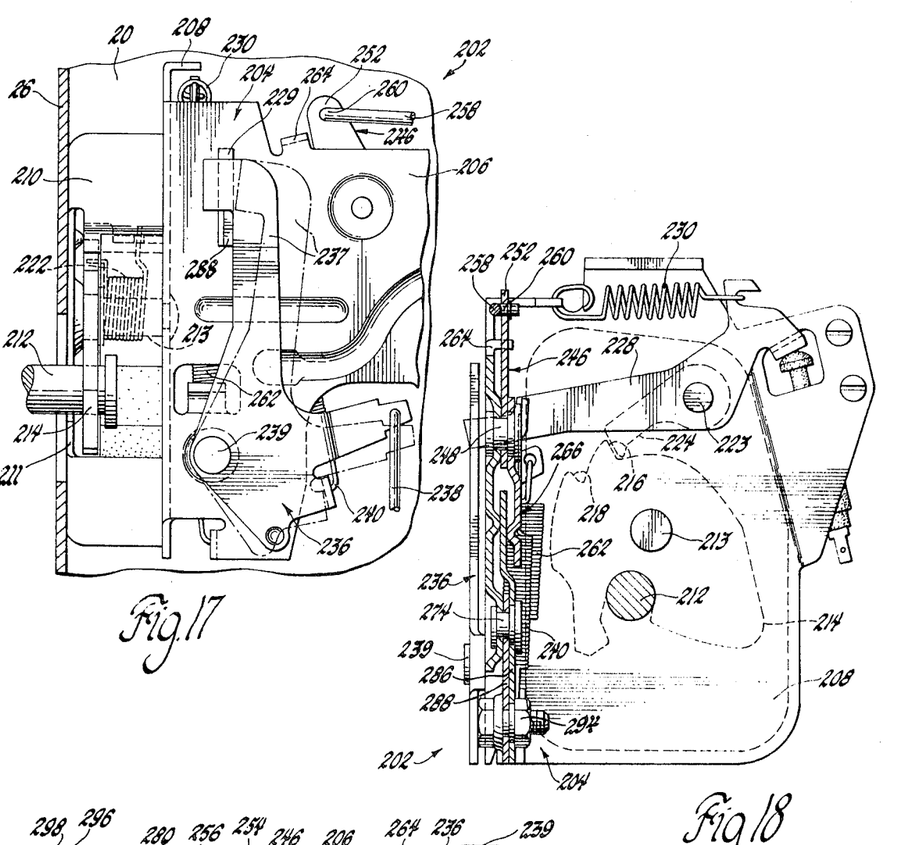
FIG. 17 is a view taken generally along the plane indicated by lines 17-17 in FIG. 14.
FIG. 18 is a view taken generally along the plane indicated by lines 18-18 in FIG. 13.
Figure 19:
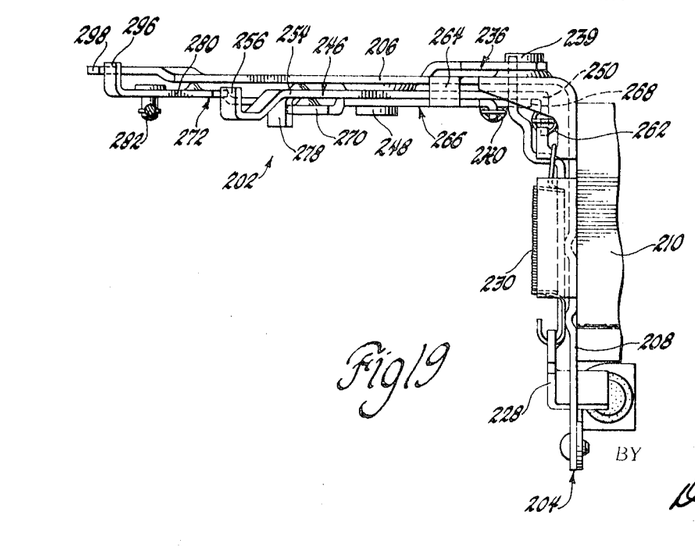
FIG. 19 is a view taken generally along the plane indicated by lines 19-19 in FIG. 13.
Figures 20, 21, 22, 23:
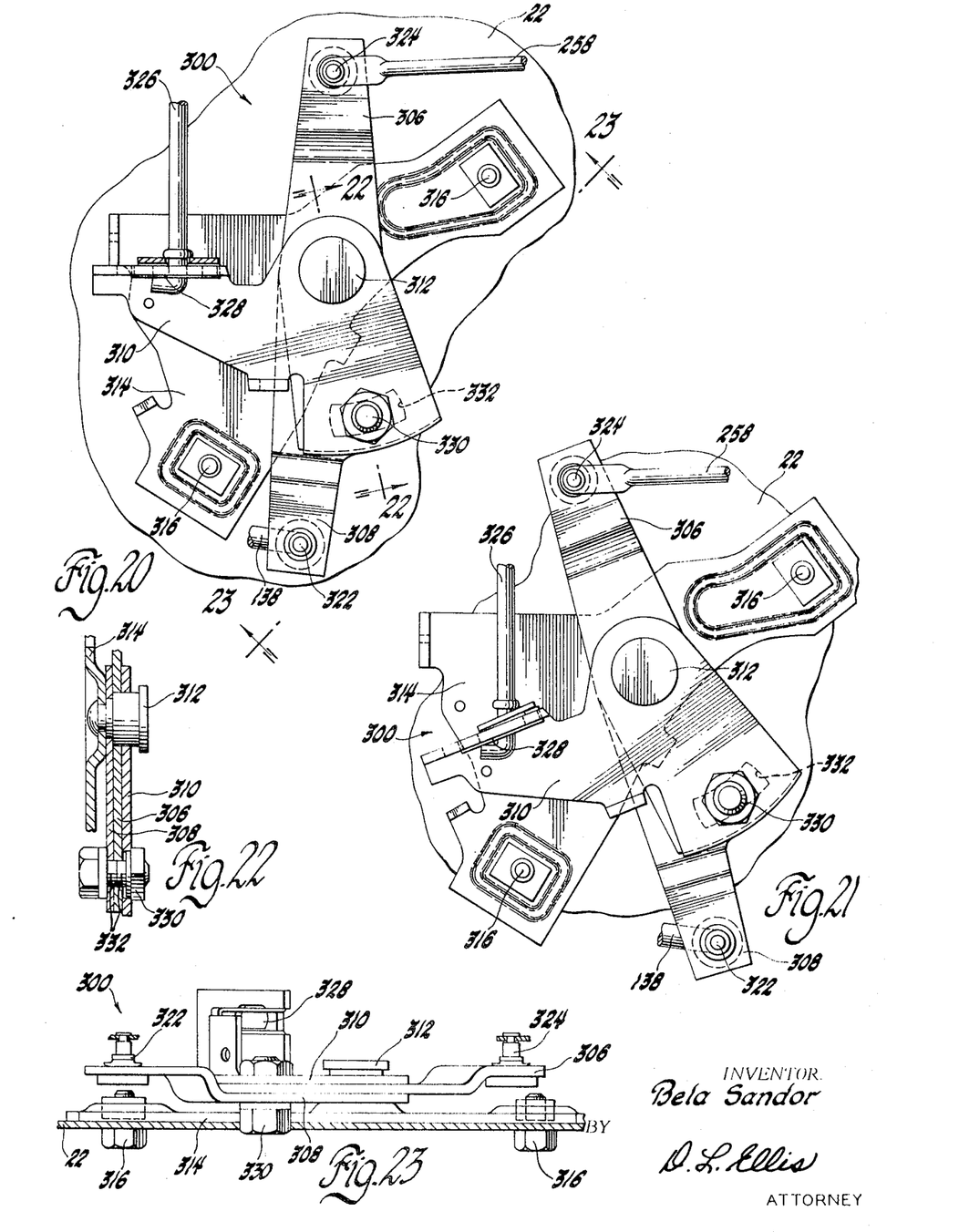
FIG. 20 is an enlarged elevational view of a portion of FIG. 1 including the centrally located latch operating bellcrank.
FIG. 21 is similar to FIG. 20 but showing the bellcrank in extended position.
FIG. 22 is a sectional view taken generally along the plane indicated by lines 22-22 in FIG. 20.
FIG. 23 is a view taken generally along the plane indicated by lines 23-23 in FIG. 20.

Referring to FIG. 17, operation of the tailgate in either the door or drop-gate mode while the window therein is in raised position is prevented by a safety lever 236 having a blocking arm 237 thereon and a link 238 pivotally connected thereto. Such lever is pivotally mounted on frame leg 206 at 239 and a tension spring 240, best seen in FIG. 13, having one end thereof mounted on the safety lever biases the latter counterclockwise in FIG. 17 so that in the closed position of the tailgate with the latchbolt 214 in latched position and release lever 228 resting at the bottom of aperture 229, the blocking arm 237 overlies the portion of the release lever 228 protruding through the aperture 229 thereby preventing upward movement of the release lever to releasing position. As seen in FIG. 1, the link 238 has a hook 242 at its lower extremity and is journaled for vertical movement relative to the tailgate by a bracket 243. Hook 242 engageable by the lower edge of the tailgate-mounted window during final lowering movement of the window, shifts the link 238 downward and thereby rotates the safety lever 236 clockwise and out of overlying relation relative to release lever 228, whereupon the latter may be rotated to release the latchbolt 214 as described. After the tailgate is closed and latchbolt 214 relatched, raising of the window permits spring 240 to rotate the safety lever back to blocking position which in turn, shifts link 238 upward into position to be reengaged by the lower edge of the window.

Figure 13:
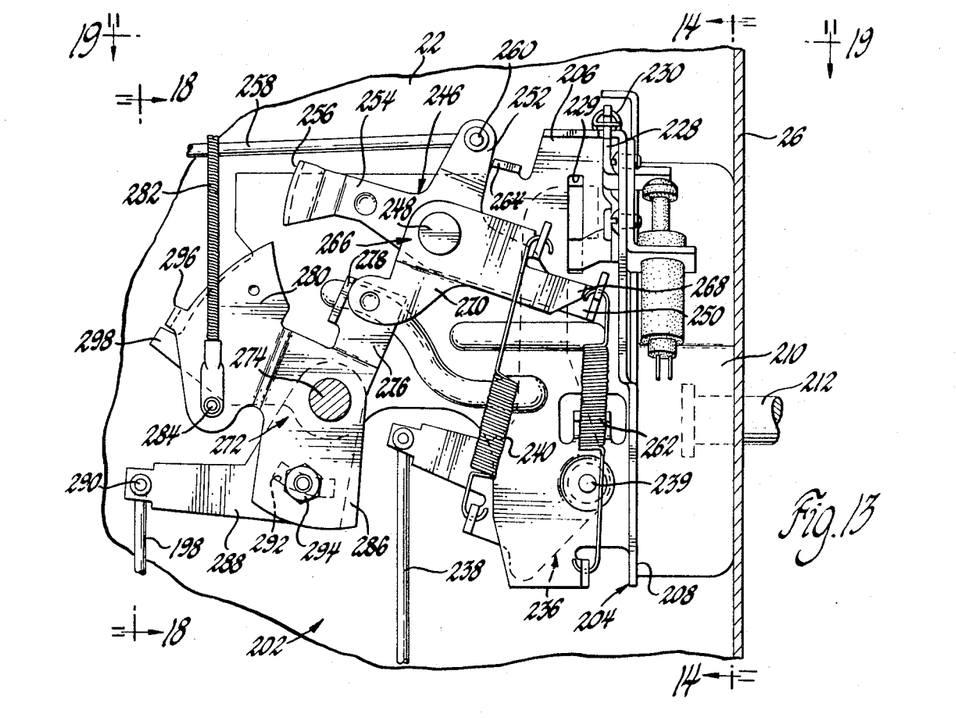
FIG. 13 is an enlarged elevational view of a portion of FIG. 1 including the main latch.

Referring to FIG. 13, a first detent operating lever 246 is pivotally mounted on a stud 248 extending from frame leg 206 and includes a lifting arm 250 underlying release lever 228, an operating arm 252 and a blocking arm 254 having thereon a blocking flange 256 extending generally perpendicularly to the plane of the blocking arm. One end of a rigid link 258 is pivotally connected to the operating arm at 260 and a coil tension spring 262 mounts between the end of the lifting arm and the frame leg 206 to bias the first operating lever 246 clockwise into engagement with stopping flange 264 on the leg 206. Also mounted on the stud 248 is a transfer lever 266 including a lifting arm 268 underlying the release lever 228 and an operating arm 270. The remaining end of safety lever tension spring 240 is attached to the transfer lever to place a clockwise bias thereon. A second operating lever 272 is pivotally mounted on a stud 274 extending from the frame leg 206 and includes a pushing arm 276 having a flange 278 lying across the plane of operating arm 270 of the transfer lever 266, a blocking arm 280 with one end of a cable 282 pivotally connected thereto at 284, and an adjusting flange 286. Also pivotally mounted on stud 274 is a lever 288 having an arcuate aperture 292 therein and the other end of the rigid link 198 pivotally connected at 290, the remote end of the rigid link being connected to lever 196 in hinge-latch 34 as described. The lever 288 is adjustably secured to adjusting flange 286 on the second operating lever for rotation with the latter as a unit by a conventional fastener 294 extending through arcuate aperture 292. Link 198, therefore, normally rigidly connects the second operating lever and lever 196 in hinge-latch 34. To compensate for any variation in the vertical distance between the lever 196 and the second operating lever, the fastener 294 may be loosened and lever 288 rotated relative to the adjusting flange 286 until the rigid link 198 fits properly between the two whereupon the fastener is tightened for normal operation. The second operating lever is maintained in its normal retracted position, with a flange 296 thereof abutting a stop 298 on the leg, by arm 270 of spring biased transfer lever 266 bearing on flange 278, FIG. 13.

With reference to FIGS. 1, 20, 21, 22 and 23, the remainder of the gate operating arrangement includes a central bellcrank assembly 300, a door handle assembly 302 and a drop-gate handle assembly 304. The bellcrank assembly 300 has three levers 306, 308, and 310 pivotally mounted on a stud 312 extending from a mounting plate 314 which is fixed by conventional means, such as threaded fasteners 316, to the inside of inner panel 22. Lever 308 has the other end of rigid link 138 pivotally connected thereto at 322, the remote end being pivotally connected to latch lever 128 in hinge-latch 36, as described, so that a rigid connection is established between the hinge-latch 36 and the bellcrank assembly 300. Lever 306 has the other end of rigid link 258 pivotally connected thereto at 324, the remote end being pivotally connected to the first operating lever 246 at 260, as described, so that a rigid connection is established between the first operating lever and the bellcrank assembly and, through the latter, between the first operating lever and hinge-latch 36. Lever 310 is connected to the drop-gate handle assembly 304 on the upper portion of inner panel 22 by a link 326 fastened at 328 so that downward movement of the link 326 initiated by actuation of the handle assembly rotates the lever 310 counterclockwise, FIGS. 1 and 20. The levers 306, 308, and 310 are adjustably secured together by a conventional threaded fastener 330 mounted on lever 310 and extending through arcuate apertures 332 in the levers 306 and 308, FIG. 22, so that upon movement of link 326 they rotate about stud 312 as a unit. To compensate for any variations in the distances between the bellcrank assembly and the hinge-latch 36 and between the first operating lever 246 and the drop-gate handle assembly 304, the fastener 330 may be loosened to permit relative rotational adjustment of the levers 306, 308, and 310 until the links 258, 138 and 326 fit properly between their respective pivotal connections, whereupon the fastener is tightened for normal operation.

The door handle assembly 302 is mounted on the upper portion of the inner panel 22 above the main latch 202 and is connected to the second operating lever 272 in the main latch by cable 282 so that actuation of the door handle lifts cable 282 and rotates the second operating lever clockwise about stud 274, FIGS. 1 and 13.

For operation of the tailgate in the conventional drop-gate mode, a release of the hinge-latch 36 and main latch 202 must be effected to permit separation of the upper corners of the tailgate from the vehicle body. With the tailgate window in fully lowered position, simultaneous release of the hinge-latch 36 and the main latch is initiated by operation of drop-gate handle assembly 304 which operation shifts link 326 downward to rotate the levers of the bellcrank 300 counterclockwise, FIG. 1, to a full releasing position which, in turn, produces a rightward shift of link 138 and leftward shift of link 258. The rightward shift of link 138 rotates detent lever 128 clockwise, FIG. 7, to its full releasing position to release the latch bolt 126 and permit unlatching of hinge-latch 36 as described. The leftward shift of link 258 rotates the first operating lever 246 from its normal retracted position, FIG. 13, counterclockwise to its extended releasing position, shown in solid lines in FIG. 15, during which rotation the lifting arm 250 engages release lever 228, pivoting the latter and releasing latch bolt 214. With the upper edges thereof thus free, the tailgate may be rotated outward about horizontal axis 18 to the conventional horizontal position shown in broken lines in FIG. 2.

With the tailgate thus released for drop-gate operation, the blocking means on the first and second operating levers 246 and 272 prevent release of the tailgate for operation in the door mode. With the operator maintaining the drop-gate handle assembly 304 in actuating position, the link 326 maintains the bellcrank assembly 300 and links 138 and 258 in their extended releasing position, the latter link, in turn, maintaining the first operating lever in its extended releasing position, FIG. 15, wherein the flange 256 on arm 254 is in blocking position in front of arm 280 on the second operating lever. In this position of the first operating lever, attempted actuation of the door handle assembly 302 to release the main latch and hinge-latch 34 by clockwise rotation of the second operating lever is arrested by interference between flange 256 and arm 280 to prevent the link 198 being raised sufficiently to release hinge-latch 34. Therefore, while the drop-gate handle assembly is held actuated, concurrent release of the tailgate as a door is impossible.

Moreover, with the drop-gate handle assembly 304 released and the upper corners of the tailgate released for drop-gate operation, a conventional lost motion connection, not shown, between link 326 and the drop-gate handle assembly allows the latter to return immediately upon release thereof to its original tailgate closed position. In response to release of the drop-gate handle assembly, spring 146 in hinge-latch 36 and spring 262 in the main latch 202 cooperate to return as a unit, the rigidly joined latch lever 228, link 138, bellcrank assembly 300, link 258 and first operating lever 246 to their retracted positions. As previously described, the released latch bolt 126 in hinge-latch 36 permits return of detent lever 128 only to its intermediate position, FIG. 8, which lever then prevents further return of these other rigidly joined members toward their retracted positions and maintains them in respective intermediate positions. The clockwise rotation of first operating lever 246 from its extended releasing position, FIG. 15, to its intermediate position, shown in broken lines in FIG. 15, situates arm 254 and flange 256 thereon upward in the position 256' wherein a portion of the flange 254 remains in blocking position in front of arm 280 on the second operating lever so that as long as the latch bolt 126 in hinge-latch 36 remains released, movement of the door handle assembly 302 in an attempt to release hinge-latch 34 will result in interference between arm 280 and flange 256 rendering release of hinge-latch 34 impossible. Thus, the drop-gate released condition of hinge-latch 36 is sensed by the blocking means through the rigid links to prevent concurrent release of the tailgate in the door mode.

Figure 14:
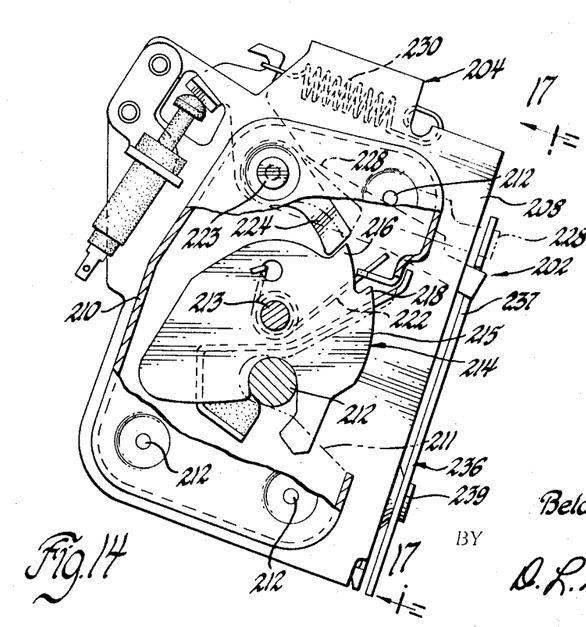
FIG. 14 is a view taken generally along the plane indicated by lines 14-14 in FIG. 13.
Figure 15:
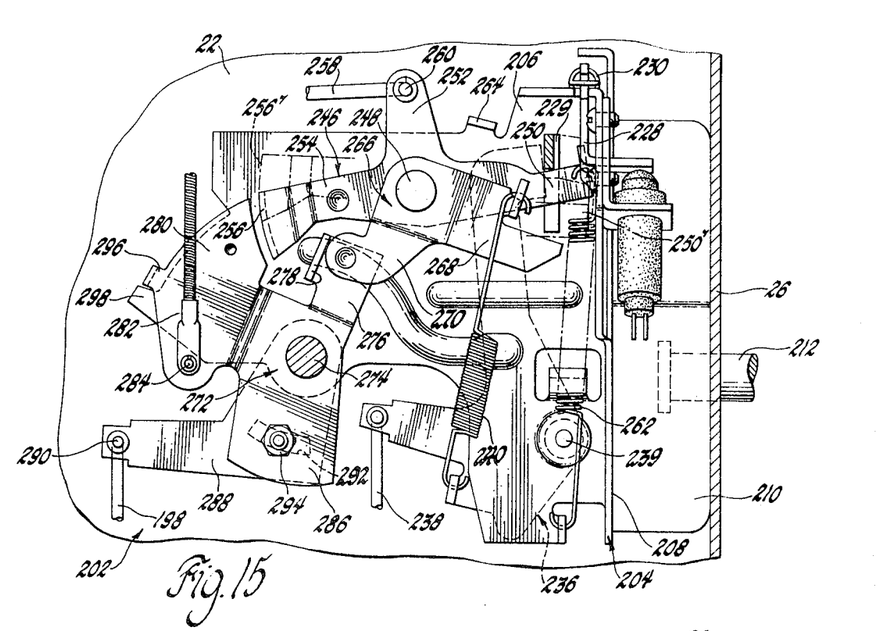
FIG. 15 is similar to FIG. 13 but showing the blocking system in one extended position thereof.

The described return or clockwise rotation of the first operating lever 246 from extended releasing position to intermediate position simultaneously lowers lifting arm 250 from its extended releasing position to a position 250', FIG. 15, wherein it disengages from the release lever 228. The lever 228 is thus allowed to return from released to rest position 228', FIG. 14, through the action of spring 230 which biases detent lever 224 into engagement with holding edge 215 of the released latchbolt 214. Thereafter, clockwise rotation of the latchbolt 214, caused by contact with striker pin 212 during closing movement of the tailgate, into the safety-latched position thereof allows the detent lever to rotate clockwise and drop behind the latchbolt shoulder 218, holding the latter in safety-latched position. Concurrently and consequently, the release lever 228 is permitted limited oscillation in aperture 229 and since the position of the first operating lever 246, and hence blocking flange 254, is not altered thereby, the transition of the main latch from unlatched to safety-latched position is independent of the blocking system and without effect thereon so that even in the safety-latched position of the tailgate, this circumstance alone will not neutralize the blocking of operation of the door handle assembly 302 to release hinge-latch 34.

From the safety-latched condition, a final inward thrust placed on the tailgate rotates latchbolt 214 clockwise relative to striker pin 212, FIG. 14, in turn rotating detent lever 224 counterclockwise until the shoulder 216 passes under the detent lever to establish detenting in fully latched position under the bias of spring 230. In an undistorted tailgate, at generally the same instant that detent shoulder 216 passes under the dethat lever the stud 108 and cap 110 in hinge-latch 36 engage and rotate the latchbolt 126 therein to latched position, releasing the detent lever 128 to return to its retracted position and there by allowing the rigid links, the levers of bellcrank assembly 300 and the first operating lever 246 to return to their inoperative or retracted positions. Thus, the lifting arm 250 is lowered to its original nonreleasing position and the spring 230 is allowed to rotate the detent lever 224 the entire distance down behind shoulder 216 whereupon the release lever 228 rests generally at the lower end of aperture 229, FIG. 13. In the case of a tailgate which is forcibly distorted out of true plane, so that the main latch reaches latched position without corresponding engagement in the hinge-latch 36, the first operating lever is held in intermediate position by the still-released hinge-latch 36 while the detent lever 224 drops behind the shoulder 216. Again, the transition of the main latch from safety latched to fully latched condition does not alter the position of the first operating lever and therefore, while the main latch may be fully latched, it remains impossible to release hinge-latch 34.

For operation of the tailgate in the door mode, a release of the hinge-latch 34 and main latch 202 must be effected to permit separation of the right edge of the tailgate from the vehicle body. With the tailgate window in fully lowered position, simultaneous release of the hinge-latch 34 and the main latch is initiated by operation of door handle assembly 302 to shift cable 282 upward, rotating the second operating lever 272 clockwise to the fully extended releasing position thereof, shown in solid lines in FIG. 16. The second operating lever, in turn, rotates the transfer lever 266 to bring transfer lever lifting arm 268 into engagement with release lever 228, rotating the latter and releasing latchbolt 214. As the second operating lever is rotated to release the latchbolt 214 the former simultaneously shifts link 198 upwardly producing, in hinge-latch 34 a counterclockwise rotation as a unit, FIGS. 9 and 10, of lever 196, shaft 178 and detent lever 186. Latch bolt 164 is thus released allowing separation of the hinge-latch from the striker pin 200 as described. With the right edge thereof free, the tailgate may be rotated outward about vertical axis 16 as a door.

With the tailgate released for door operation, the blocking means on the first and second operating levers prevent release of the tailgate for operation in the drop-gate mode. With the operator maintaining the door handle assembly 302 in actuating position, the cable 282 maintains the second operating lever in its extended releasing position, FIG. 16, wherein the arm 280 on the second operating lever is placed in blocking position under flange 256 on arm 254 of the first operating lever. In this position of the second operating lever, attempted actuation of the drop-gate handle assembly 304 to cause counterclockwise rotation of the first operating lever is arrested by interference between the arm 280 and the flange 256 before the links 258 and 138 have been shifted sufficiently to allow release of hinge-latch 36. Therefore, while the door handle assembly is held actuated, concurrent release of the tailgate in the drop-gate mode is impossible.

Moreover, with the door handle assembly 302 subsequently released and the tailgate open as a door, the flexibility of the cable 282 between the second operating lever and the door handle assembly allows the latter to return to its original tailgate closed position. Spring 194 in hinge-latch 34 and spring 240 in the main latch 202 cooperate to return detent lever 186, link 198, second operating lever 272 and transfer lever 266 toward their retracted positions. As previously described, the released latch bolt 164 and cam 170 in hinge-latch 34 permit return of detent lever 186 only to its intermediate position, FIG. 10, and the lever in turn prevents further return of the link, second operating lever and transfer lever from their respective intermediate positions, indicated in broken lines in FIG. 16. In this intermediate position blocking arm 280 is located in position 280', FIG. 16, wherein it remains in blocking position under flange 254 on the first operating lever so that as long as the latchbolt 164 in hinge-latch 34 remains unlatched, movement of the drop-gate handle assembly 304 in an attempt to release hinge-latch 36 will result in interference between arm 280 and flange 256, rendering release of hinge-latch 36 impossible. Thus, the condition of hinge latch 34 is sensed by the blocking means through the rigid link 198 to prevent concurrent release of the tailgate in the other mode.

Figure 16:
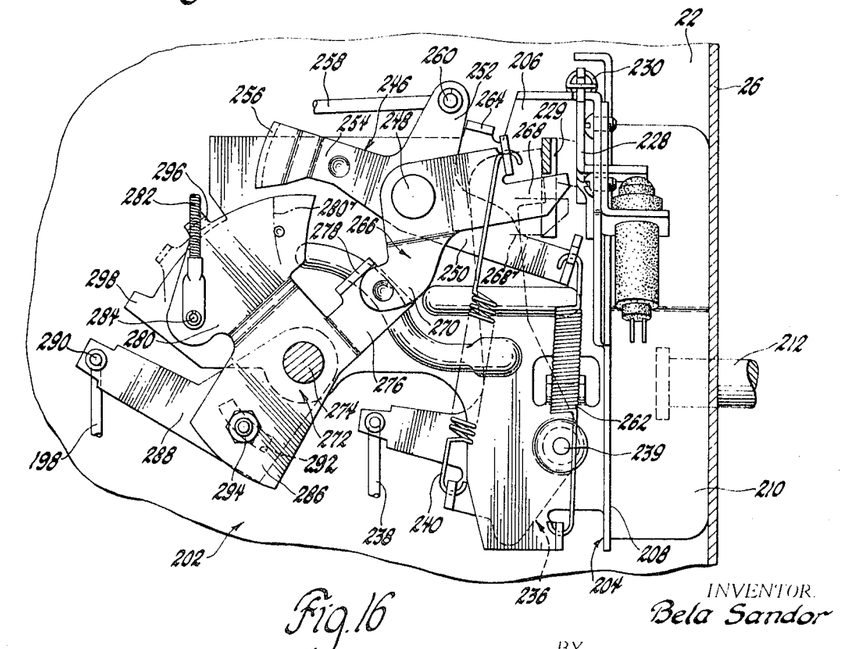
FIG. 16 is similar to FIG. 13 but showing the blocking system in another extended position thereof.

The described return of counterclockwise rotation of the second operating lever 272 from extended position to intermediate position simultaneously permits clockwise rotation of transfer lever 266 and lowering of lifting arm 268 from its extended releasing position to a position 268', FIG. 16, wherein it disengages from the release lever 228. The lever 228 is thus allowed to return from released to rest position 228', FIG. 14, through the action of spring 230 which biases detent lever 224 into engagement with holding edge 215 of released latchbolt 214. Clockwise rotation of the latchbolt 214, caused by contact with striker pin 212 during closing movement of the tailgate, into the safety-latched position thereof allows the detent lever to rotate clockwise and drop behind the latchbolt shoulder 218, holding the latter in safety-latched position. Concurrently and consequently, the release lever 228 is permitted limited oscillation in aperture 229 and since the position of the transfer lever 266 and second operating lever 272, and hence blocking arm 280, are not altered thereby, the transition of the main latch from unlatched to safety-latched position is independent of the blocking system and without effect thereon so that even in the safety-latched position of the tailgate, this circumstance alone will not neutralize the blocking of operation of the drop-gate handle assembly 304 to release hinge-latch 36.

From the safety latched condition, a final inward thrust placed on the tailgate rotates latchbolt 214 clockwise relative to striker pin 212, FIG. 14, in turn rotating detent lever 224 counterclockwise until the shoulder 216 passes under the detent lever to establish detenting in fully latched position under the bias of spring 230. In an undistorted tailgate, at generally the same instant that detent shoulder 216 passes under the detent lever the striker pin 200 in hinge-latch 34 engages and rotates the latchbolt 164 and cam 170 to latched position, allowing the detent lever 186 to return to its retracted position, thereby permitting the rigid link 198, the second operating lever 272 and the transfer lever 266 to return to their retracted positions. Thus, the lifting arm 268 is lowered to its original nonreleasing position and the spring 230 is allowed to rotate the detent lever 224 the entire distance down behind shoulder 216 whereupon the release lever 228 rests generally at the lower end of aperture 229, FIG. 13. In the case of a tailgate which is forcibly distorted out of true plane, so that the main latch reaches latched position without corresponding engagement in the hinge-latch 34, the second operating lever is held in intermediate position by the still-released hinge-latch 34 while the detent lever 224 drops behind the shoulder 216. Again, the transition of the main latch from safety-latched to fully latched condition does not alter the position of the first operating lever and therefore, while the main latch may be fully latched, it remains impossible to release hinge-latch 36.

The blocking arrangement is also effective when both the drop-gate handle assembly 304 and the door handle assembly 302 are grasped and actuated in an effort to release both hinge-latches 34 and 36 simultaneously. In that event, simultaneous rotation of first operating lever 246 and second operating lever 272 will create interference between the lower edge of flange 256 and the upper corner of blocking arm 280, FIG. 13, thereby preventing either of the operating levers from reaching its extended releasing position. Anything less than perfect simultaneous rotation of the two operating lever will result in operation of the tailgate in one of its two modes with the other being blocked as previously described.

Having thus described the invention what I claim is:

1. In a station wagon type vehicle body having a rear compartment opening, a closure for closing said opening and means mounting said closure on said body for swinging movement between open and closed positions relative to said opening about either of two generally perpendicular axes and including a biaxial multihinge providing a pivotal connection between said body and said closure for swinging movement of said closure about either of said two axes, a first hinge-latch assembly between said body and said closure operative in latched condition thereof to provide a pivotal connection for swinging movement of said closure about a first one of said two axes and actuable to a released condition to permit swinging movement of said closure about a second one of said two axes, a second hinge-latch assembly between said body and said closure operative in latched condition thereof to provide a pivotal connection for swinging movement of said closure about said second one of said two axes and actuable to a released condition to permit swinging movement of said closure about said first one of said two axes, and latch means releasably holding said closure against movement from a closed position thereof about either of said axes and including a striker mounted on said body and a latchbolt mounted on said closure for movement between latched and unlatched positions relative to said striker, the improvement in said latch means of a detenting system comprising; detent means operative to releasably hold said bolt in said latched position; a first detent operating lever movable to release said detent means; a second detent operating lever movable to release said detent means; first means rigidly connecting said first operating lever and said first hinge-latch assembly for release of the latter simultaneously with release of said detent means; second means rigidly connecting said second operating lever and said second hinge-latch assembly for release of the latter simultaneously with release of said detent means; and blocking means directly on said first and second operating levers engageable to prevent simultaneous movement of said operating levers toward the detent releasing positions thereof and further engageable in response to a released condition of either said first or second hinge-latch assemblies sensed independently of the condition of said latch bolt through the respective one of said first or second connecting means for preventing release of one of said hinge-latch assemblies subsequent to release of the other and before said released hinge latch assembly is returned to latched condition.

2. In a station wagon type vehicle body having a rear compartment opening, a closure for closing said opening, means mounting said closure on said body for swinging movement between open and closed positions relative to said opening about either of two generally perpendicular axes and including a biaxial multihinge providing a pivotal connection between said body and said closure for swinging movement of said closure about either of said two axes, a first hinge-latch assembly between said body and said closure operative in the latch condition thereof to provide a pivotal connection for swinging movement of said closure about a first one of said to axes and actuable to a released condition to permit swinging movement of said closure about a second one of said two axes and a second hinge-latch assembly between said body and said closure operative in the latched condition thereof to provide a pivotal connection for swinging movement of said closure about second of said two axes and actuable to a released condition to permit swinging movement of said closure about said first one of said two axes, and latch means releasably holding said closure against movement from the closed position thereof about either of said two axes and including a striker mounted on said body and a latch bolt mounted on said closure for movement between latched and unlatched positions relative to said striker, the improvement in said latch means of a detenting system comprising: detent means operative to releasably hold said bolt in said latched position thereof; a first operating lever movable between a normal retracted position and an extended detent releasing position; a second operating lever movable between a normal retracted position and an extended detent releasing position; a first link system connected between said first hinge-latch assembly and said first operating lever movable to a releasing position wherein said first operating lever is moved to said detent releasing position simultaneously with actuation of said first hinge-latch assembly to said released condition thereof and maintained in said releasing position by said released first hinge-latch assembly until the latter is returned to latched condition so that said first operating lever is maintained in said extended releasing position until said released first hinge-latch assembly is returned to said latched condition; a second link system connected between said second hinge-latch assembly and said second operating lever movable to a releasing position wherein said second operating lever is moved to said detent releasing position simultaneously with actuation of said second hinge-latch assembly to said released condition thereof and maintained in said releasing position by said released second hinge-latch assembly until the latter is returned to said latch condition; and blocking means directly on said first and second operating levers engageable in said extended detent releasing position of said first operating lever to prevent actuation of said second hinge-latch assembly and movement of said second operating lever and said second link system to detent releasing position and engageable in said extended detent releasing position of said second operating lever to prevent actuation of said first hinge-latch assembly and movement of said first operating lever and said first link system to detent releasing position.

3. In a closure arrangement for a station wagon type vehicle body having a rear compartment opening and including a closure member, means mounting said closure member on said body for swinging movement between open and closed positions relative to said opening about either of two generally perpendicular axes and further including a biaxial multihinge forming a pivotal connection between said closure and said body for swinging movement of said closure about either of said two axes, a first hinge-latch assembly forming in the latched condition thereof a pivotal connection between said closure and said body for swinging movement of said closure about a first of said two axes and actuable to a released condition to permit swinging movement of said closure about a second of said two axes, a second hinge-latch assembly forming in the latch condition thereof a pivotal connection between said closure and said body for swinging movement of said closure about said second of said two axes and actuable to a released condition to permit swinging movement of said closure about said first of said two axes, closure operating means comprising: a body mounted striker; a latchbolt mounted on said closure for movement between latched and unlatched positions relative to said striker; detent means operative to releasably hold said latch bolt in said latched position; a first operating lever movable between a retracted position and an extended detent releasing position having thereon a first blocking portion defining a first path of motion during movement of said first operating lever between said extended and retracted positions; a second operating lever movable between a retracted position and an extended detent releasing position having thereon a second blocking portion defining a second path of motion during movement of said second operating lever between said extended and said retracted positions, said first motion path intersecting said second motion path thereby rendering impossible simultaneous movement of said first and second operating levers to said detent releasing positions thereof and said blocking portions being engageable to render impossible movement of either one of said two operating levers to said detent releasing positions thereof as long as the other of said two operating levers remains in said detent releasing position thereof; first latch operating means mounted on said closure and including handle means movable between an inoperative position and a closure opening position, a rotatably mounted bellcrank connected to said handle means and rotatable thereby from an inoperative position to a door opening position, and first link means rigidly connecting said bellcrank to said first hinge-latch assembly and to said first operating lever and shiftable by said bellcrank from an inoperative to a closure opening position during which movement said first operating lever is moved to said extended detent releasing position simultaneously with release of said first hinge-latch assembly, said first hinge-latch assembly in the released condition thereof retaining said first link means and said bellcrank in said door opening position and said first detent operating lever in said extended detent releasing position thereof; and second latch operating means on said closure and including second handle means movable between an inoperative position and a closure opening position and connected to said second operating lever so that movement of said second handle means from said inoperative to said closure opening position moves said second operating lever from said retracted position to said extended detent releasing position, and second link means rigidly connecting said second operating lever and said second hinge-latch assembly and shiftable from an inoperative to a closure opening position upon movement of said second operating lever from said retracted to said extended position thereof to release said second hinge-latch assembly simultaneously with release of said detent means, said second hinge-latch assembly in the released condition thereof retaining said second link means in said closure opening position and said second detent operating lever in said extended detent releasing position thereof.